US009094164B2

(12) United States Patent
Subramanian et al.

(10) Patent No.: US 9,094,164 B2
(45) Date of Patent: Jul. 28, 2015

(54) METHODS AND APPARATUS TO IMPROVE CHANNEL ESTIMATION IN COMMUNICATION SYSTEMS

(75) Inventors: Sundar Subramanian, Somerville, NJ (US); Xinzhou Wu, Monmouth Junction, NJ (US); Quan Geng, Urbana, IL (US); Cyril Measson, Somerville, NJ (US); Thomas J. Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/448,638

(22) Filed: Apr. 17, 2012

(65) Prior Publication Data

US 2013/0272443 A1    Oct. 17, 2013

(51) Int. Cl.
*H04L 5/00*       (2006.01)
*H04L 1/00*       (2006.01)
*H04L 27/26*     (2006.01)
*H04L 25/02*     (2006.01)

(52) U.S. Cl.
CPC ............ *H04L 5/0048* (2013.01); *H04L 1/0042* (2013.01); *H04L 1/0068* (2013.01); *H04L 27/2613* (2013.01); *H04L 5/0007* (2013.01); *H04L 25/0226* (2013.01)

(58) Field of Classification Search
CPC . H04L 1/0003; H04L 5/0007; H04L 27/2647; H04W 28/04
USPC ............................ 370/329, 337; 375/260, 295
See application file for complete search history.

(56) References Cited

U.S. PATENT DOCUMENTS

| 6,904,550 | B2 | 6/2005 | Sibecas et al. | |
|---|---|---|---|---|
| 2005/0195734 | A1 | 9/2005 | Sandell et al. | |
| 2006/0013338 | A1* | 1/2006 | Gore et al. | 375/324 |
| 2007/0071119 | A1* | 3/2007 | Davydov et al. | 375/260 |
| 2007/0189240 | A1 | 8/2007 | Cho et al. | |
| 2008/0108310 | A1* | 5/2008 | Tong et al. | 455/69 |
| 2008/0212462 | A1* | 9/2008 | Ahn et al. | 370/209 |
| 2008/0232490 | A1 | 9/2008 | Gross et al. | |
| 2009/0028100 | A1 | 1/2009 | Mukkavilli et al. | |
| 2009/0031185 | A1* | 1/2009 | Xhafa et al. | 714/751 |
| 2009/0052381 | A1 | 2/2009 | Gorokhov et al. | |

(Continued)

OTHER PUBLICATIONS

Dahlman Erik et al., "4G LTE/LTE-Advanced for Mobile Broadband—Chapter 10", Mar. 29, 2011, pp. 145-202, XP055046016.

(Continued)

*Primary Examiner* — Leon-Viet Nguyen
(74) *Attorney, Agent, or Firm* — Linda G. Gunderson

(57) ABSTRACT

A method, an apparatus, and a computer program product for wireless communication are provided. The apparatus generates a codeword, determines at least one puncture to the codeword based on allowing a legacy receiver to decode the codeword without knowledge of the at least one puncture, replaces each of the at least one puncture with a pilot, and transmits the codeword. The apparatus may also generate an IEEE 802.11 codeword having pilots in a first set of subcarriers, and puncture the codeword with additional pilots unknown to a legacy receiver in a second set of subcarriers. Accordingly, when an original set of pilot symbols is insufficient or inappropriately placed in a resource structure, a codeword may be transmitted with a new pilot structure capable of being decoded by legacy receivers not aware of the new pilot structure.

35 Claims, 13 Drawing Sheets

(56) References Cited

U.S. PATENT DOCUMENTS

2010/0150069 A1* 6/2010 Fang et al. .................... 370/328
2011/0142025 A1* 6/2011 Agee et al. .................... 370/342
2011/0199986 A1   8/2011 Fong et al.
2011/0244877 A1  10/2011 Farajidana et al.
2011/0252139 A1  10/2011 Bhattad et al.
2011/0286423 A1  11/2011 Berggren et al.

OTHER PUBLICATIONS

International Search Report and Written Opinion—PCT/US2013/036818—ISA/EPO—Dec. 2, 2013.
Sesia S., et al., "Multiple Antenna Techniques for LTE-Advanced" in: "LTE—The UMTS Long Term Evolution From Theory to Practice, 2nd Edition", Jul. 20, 2011, Wiley, pp. 651-672.

* cited by examiner

METHODS AND APPARATUS TO IMPROVE CHANNEL ESTIMATION IN COMMUNICATION SYSTEMS

BACKGROUND

1. Field

The present disclosure relates generally to communication systems, and more particularly, to improving channel estimation in communication systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In many communication systems, a current generation of devices may have a particular way of providing pilots for channel estimation within a communication block. Accordingly, when an original set of pilots is insufficient or inappropriately placed in the communication block, a codeword may be transmitted with a new pilot structure capable of being decoded by legacy receivers not aware of the new pilot structure. For a new receiver, the codeword appears as a new code with a better pilot structure and better performance. For a legacy receiver, the codeword appears as noise in resource positions punctured with new pilot symbols. Thus, a new method of transmitting pilots is provided such that newer generation receivers can experience improved channel estimation performance while older generation devices that are unaware of a change in pilot positions may still decode messages from the new transmissions.

In an aspect of the disclosure, a method, an apparatus, and a computer program product for wireless communication are provided. The apparatus generates a codeword, determines at least one puncture to the codeword based on allowing a legacy receiver to decode the codeword without knowledge of the at least one puncture, replaces each of the at least one puncture with a pilot, and transmits the codeword.

In another aspect of the disclosure, the apparatus generates an IEEE 802.11 codeword having pilots in a first set of subcarriers, and punctures the codeword with additional pilots unknown to a legacy receiver in a second set of subcarriers.

DETAILED DESCRIPTION

Figure 1:
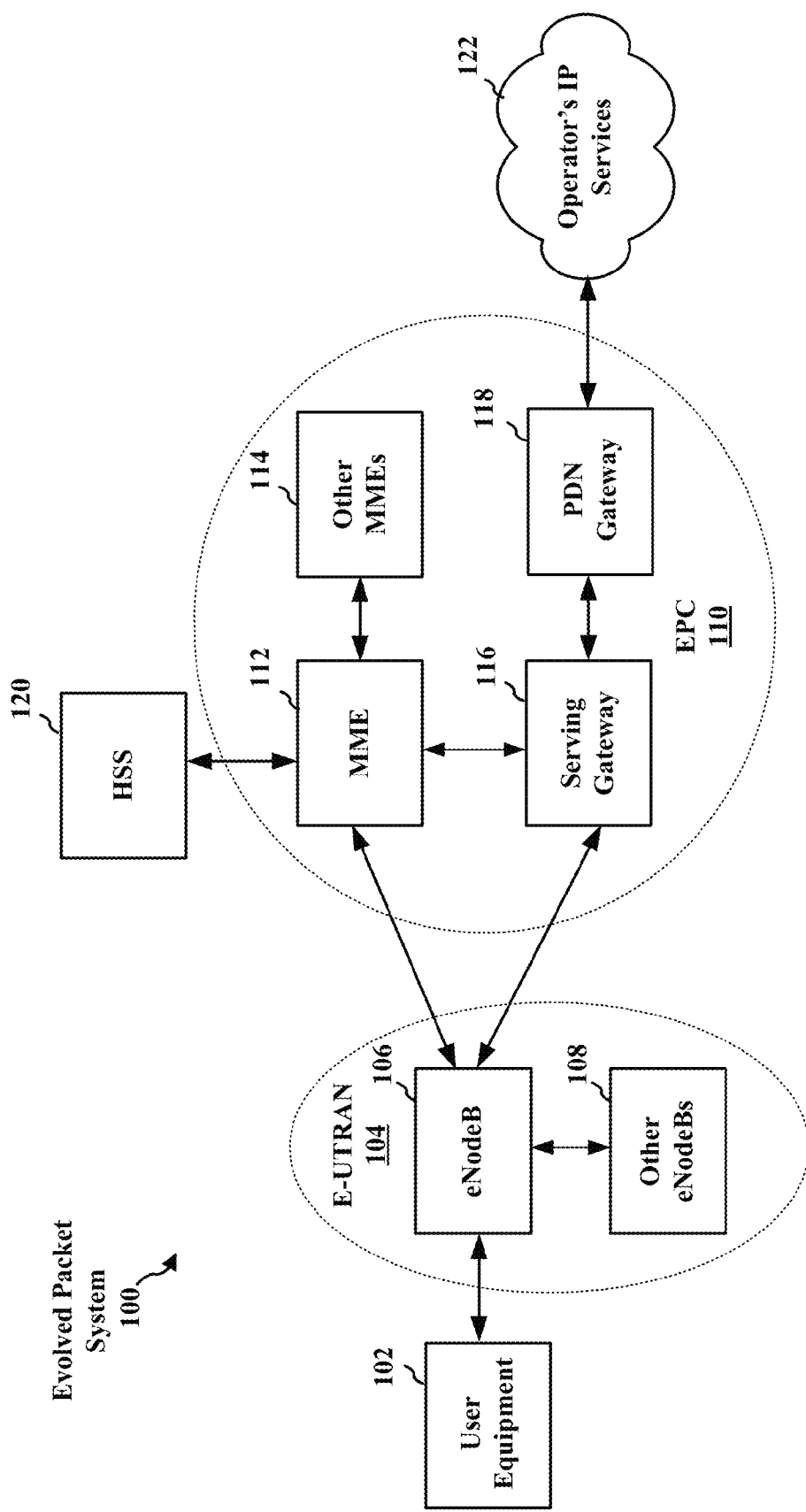
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
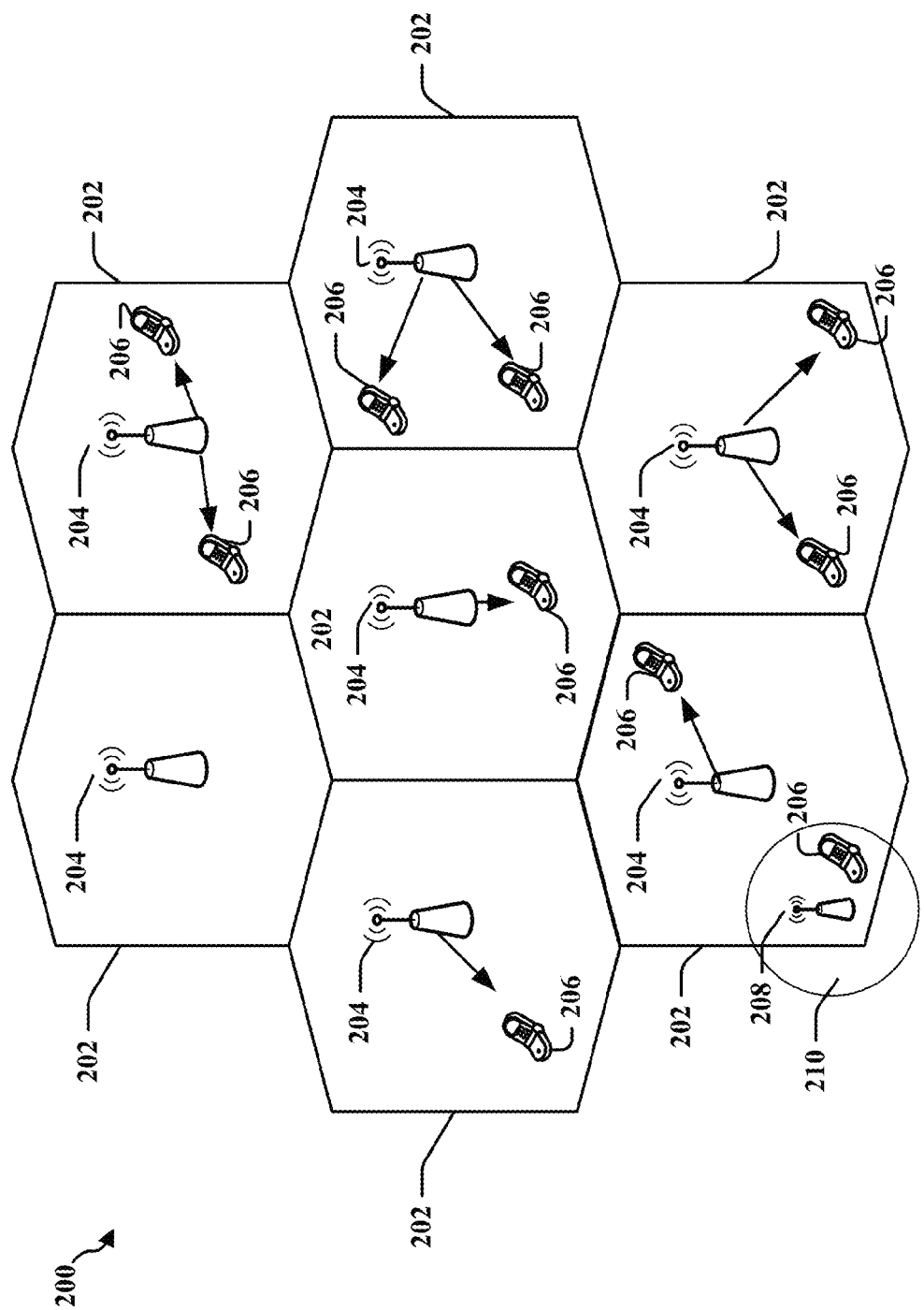
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
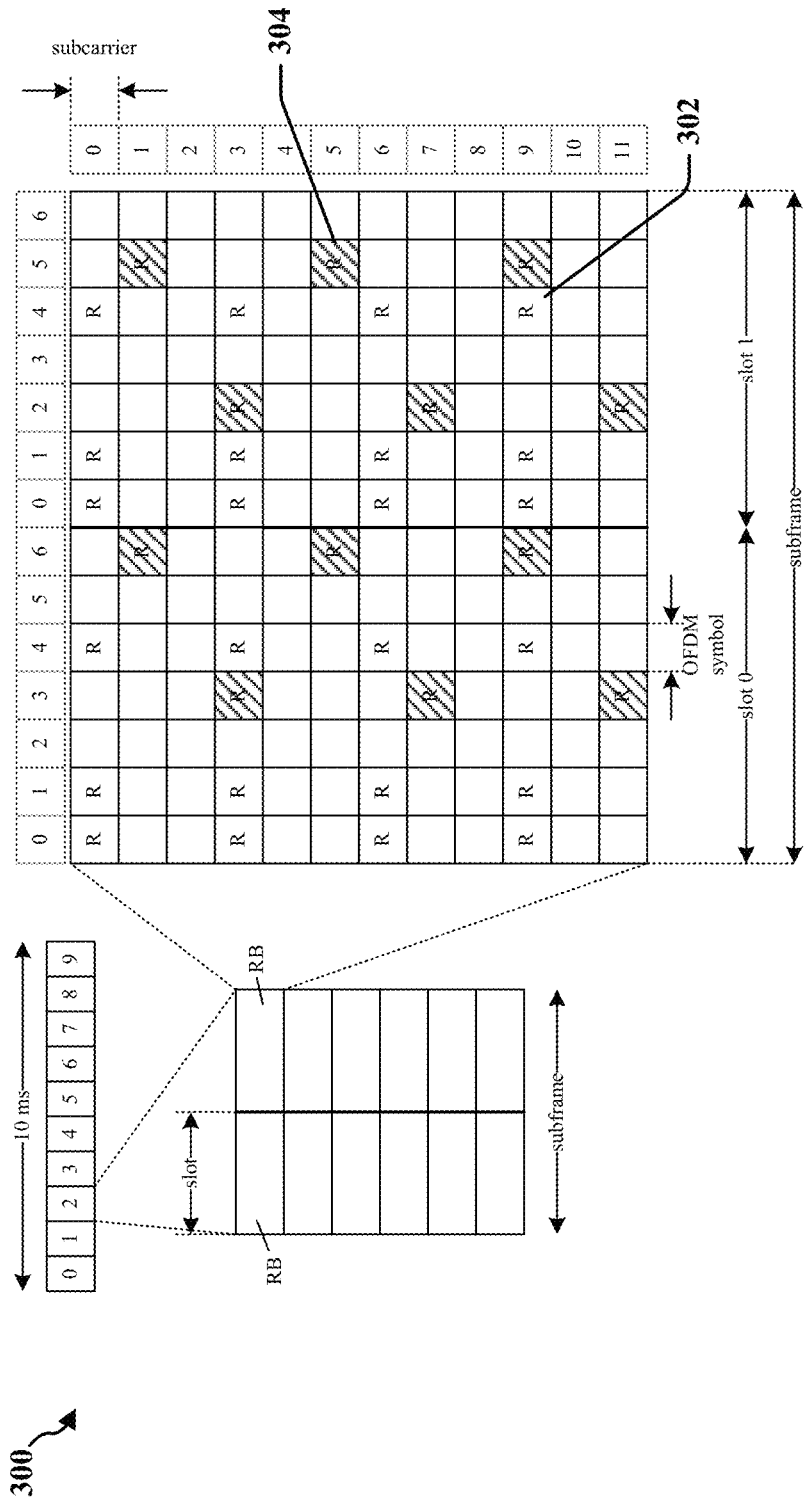
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
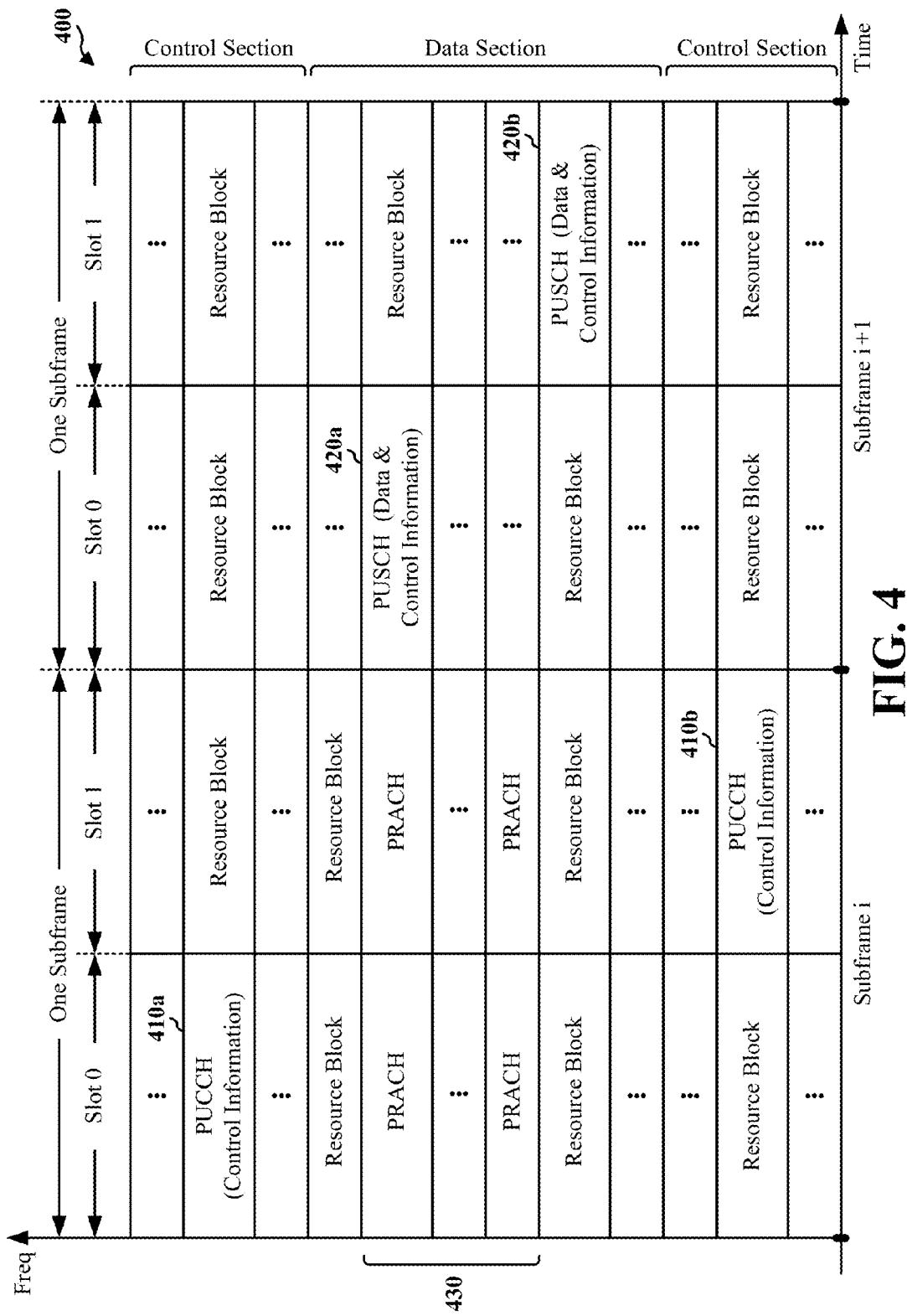
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
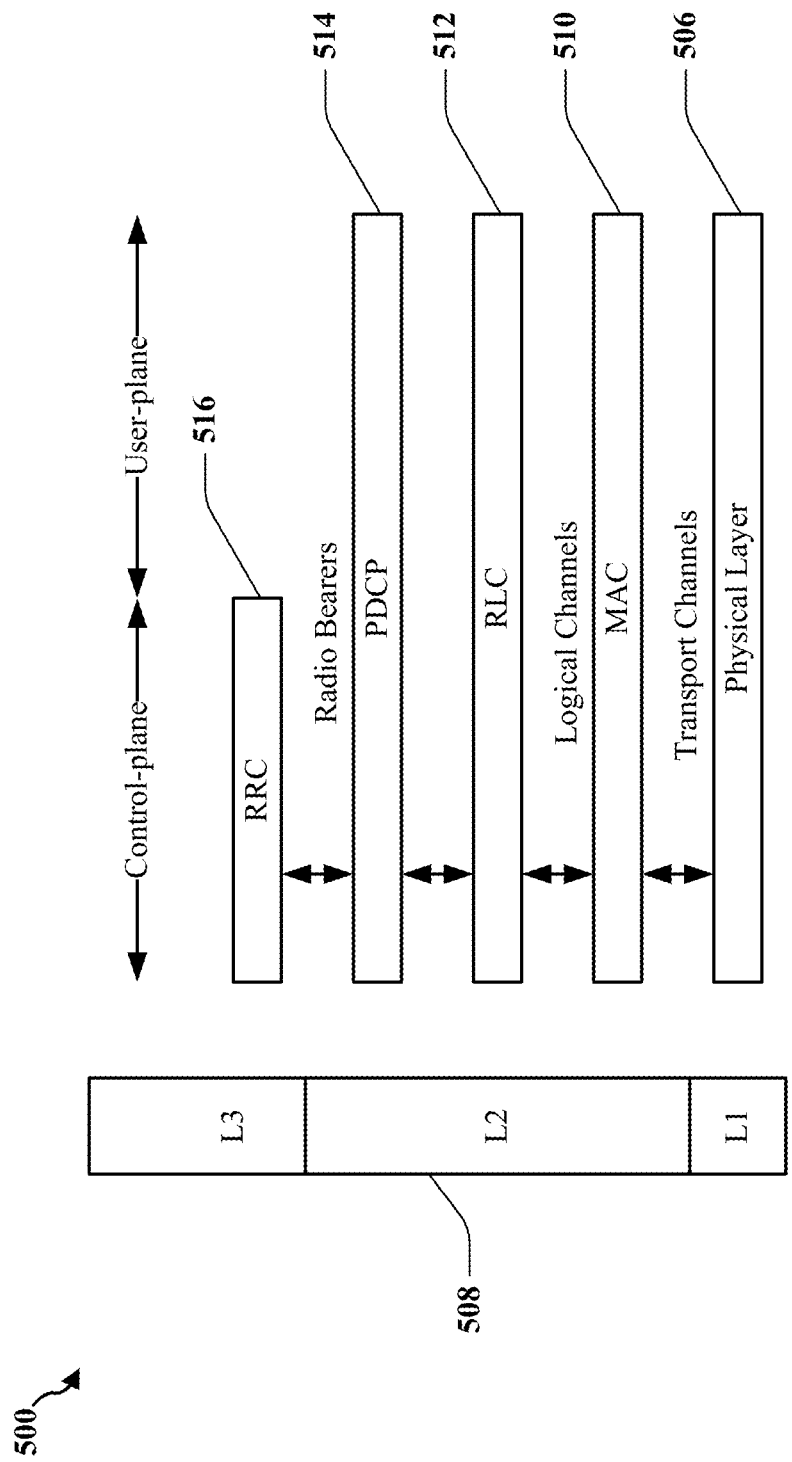
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
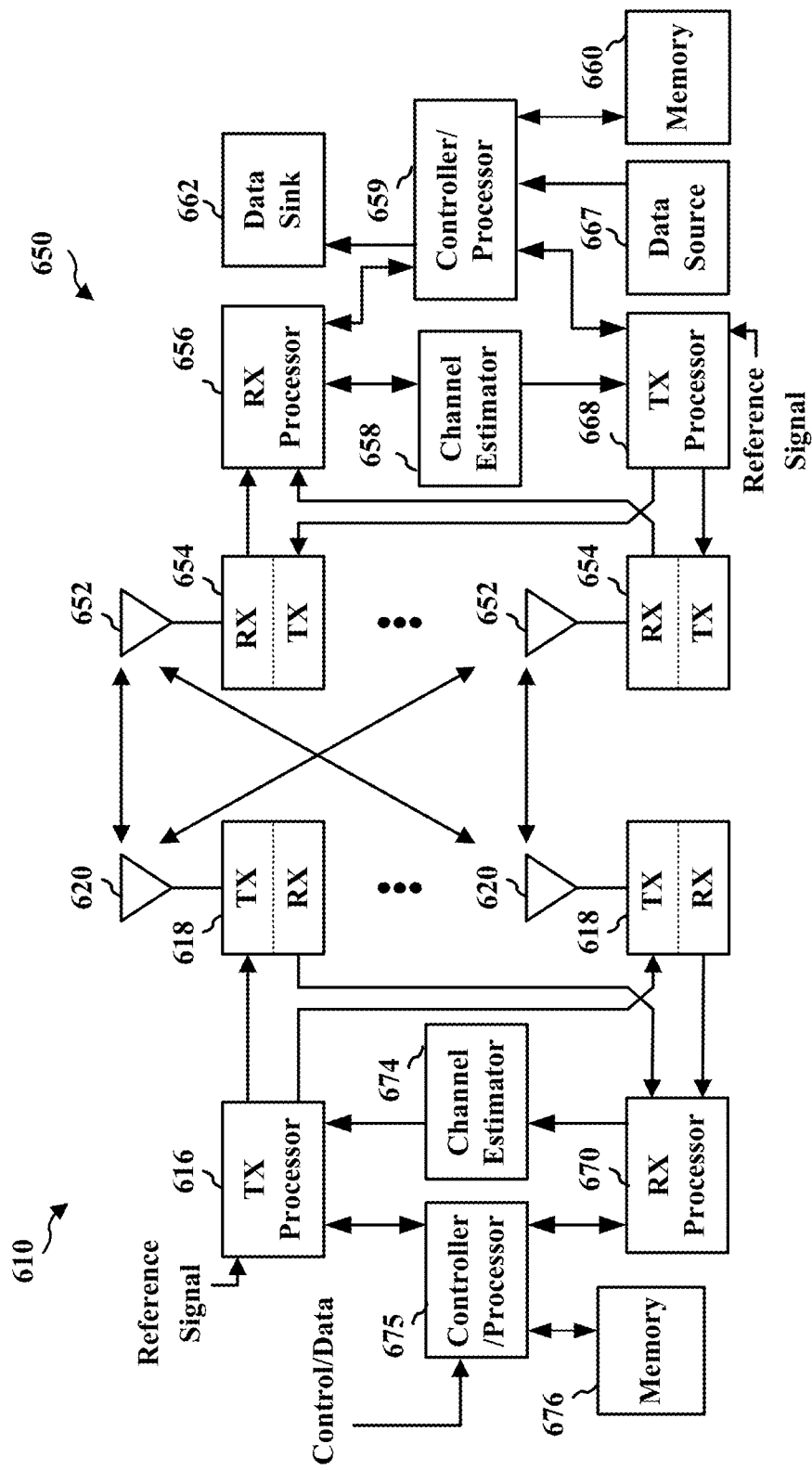
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
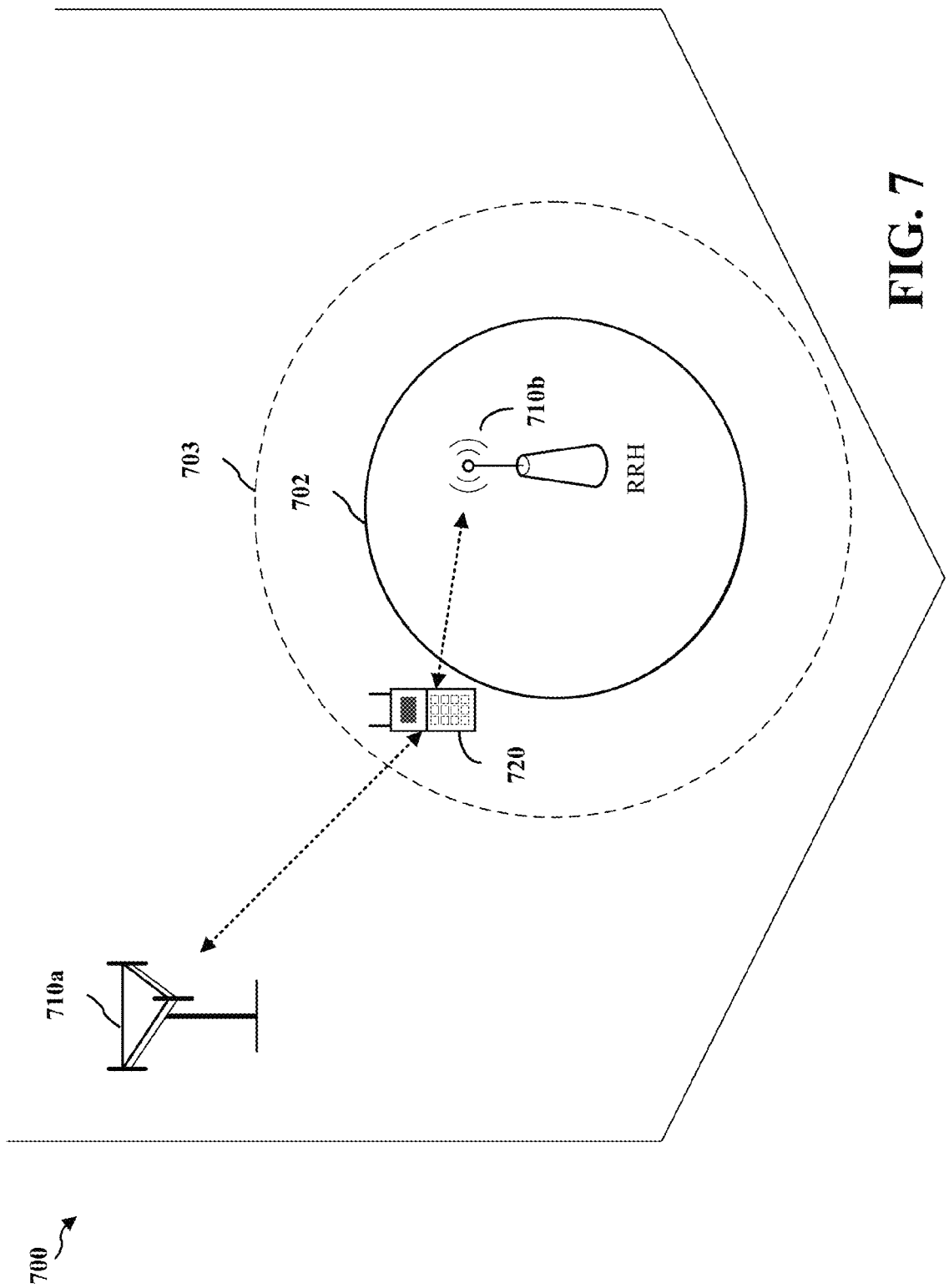
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In many communication systems, a current generation of devices may have a particular way of providing pilots for channel estimation within a communication block. In an aspect of the disclosure, a new method of transmitting pilot signals is provided such that newer generation receivers can experience improved channel estimation performance while older generation devices that are unaware of a change in pilot signal positions may still decode messages from the new transmissions.

In a communication system, such as an IEEE 802.11-based system, pilot signals for channel estimation are designed for a particular application/use. As newer applications and requirements arise, the communication system may be used in environments for which they are not designed for. For example, a new application such as a dedicated short range communication (DSRC) system for vehicular systems is an IEEE 802.11p-based system applied to vehicular communications even though the pilot signals in IEEE 802.11 were designed for an indoor and low-mobility environment.

Figure 8:
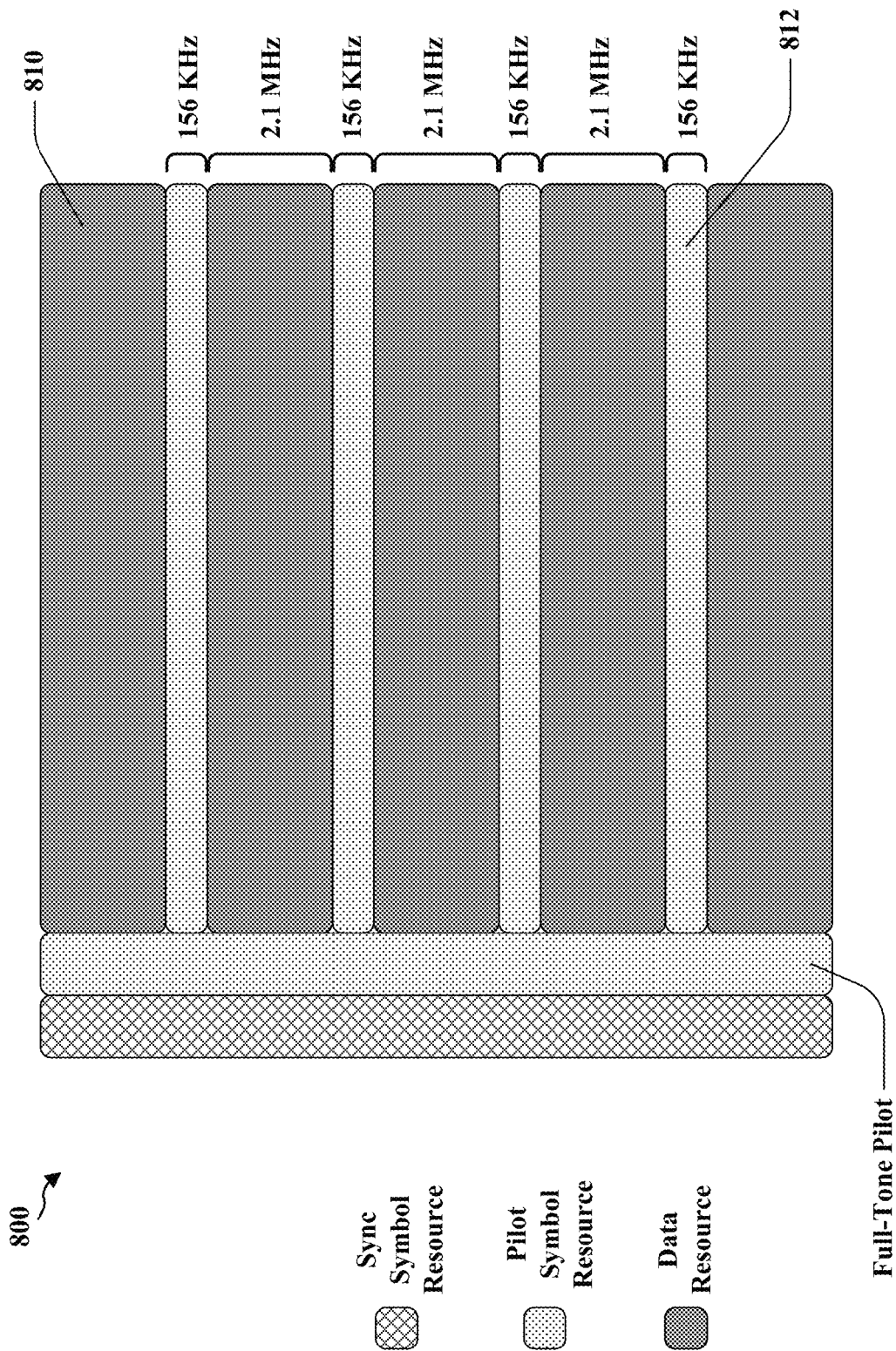
FIG. 8 is a resource structure illustrating an IEEE 802.11 pilot symbol scheme.

FIG. 8 is a resource structure 800 illustrating an IEEE 802.11 pilot symbol scheme. DSRC utilizes a physical layer designed for a low-mobility or stationary environment in a multiple-path high-speed mobile environment. Referring to FIG. 8, DSRC may utilize a comb pilot structure such as the resource structure 800, wherein the pilots are separated by 2.1 MHz and have a tone width of approximately 156 KHz. However, use of such resource structure in DSRC may hinder channel tracking when both delay spread and mobility are present. Moreover, because convolutional coding without time interleaving may be implemented, DSRC using such resource structure may be susceptible to channel fades. Also, the resource structure may deteriorate reliability in DSRC, especially at critical times. For example, because of a relatively high velocity during crashes, packets may fail with higher probability.

Still referring to FIG. 8, in the IEEE 802.11 pilot symbol scheme, the pilots are separated by a large frequency gap (greater than the coherence bandwidth) and full-tone pilots are only present at the beginning of a packet. This makes conventional channel estimation extremely challenging when the environment has a coherence bandwidth smaller than a pilot spacing, or a coherence time smaller than a packet length. Accordingly, a mechanism is desired for overcoming the existing problems with the IEEE 802.11 pilot symbol scheme that provides an improved pilot structure and allows older/legacy IEEE 802.11 devices to be able to decode transmissions having the improved pilot structure.

In an aspect, a new transmitter may introduce and transmit pilot symbols in positions additional to the current pilot symbol positions in the resource structure 800. The pilot symbols transmitted in the additional positions are decodable by an enhanced receiver.

In a communication scheme, an information sequence of K bits may be converted into a codeword or coded sequence of N bits (K→N code). The N bits may then be modulated by a symbol from a constellation (e.g., QPSK). The modulated symbols may occupy resources allocated for transmitting the information. For example, the modulated symbols may occupy the resources 810 in the resource structure 800 of FIG. 8. A total number of resources for transmitting the information may be denoted as T.

A few other resources (e.g., positions in the resource structure known to the receiver) do not contain coded bits, but symbols whose values are known to the receiver. These symbols may be pilot symbols used for channel estimation, such as the pilot symbols 812 of FIG. 8. Resources for the pilot symbols currently positioned in the resource structure 800 are referred to as P. If an original set of pilot symbols is insufficient or inappropriately placed in the resource structure 800, then a method for transmitting signals with a better pilot structure capable of being decoded by older/legacy receivers not aware of the new pilot structure is needed.

Figure 9:
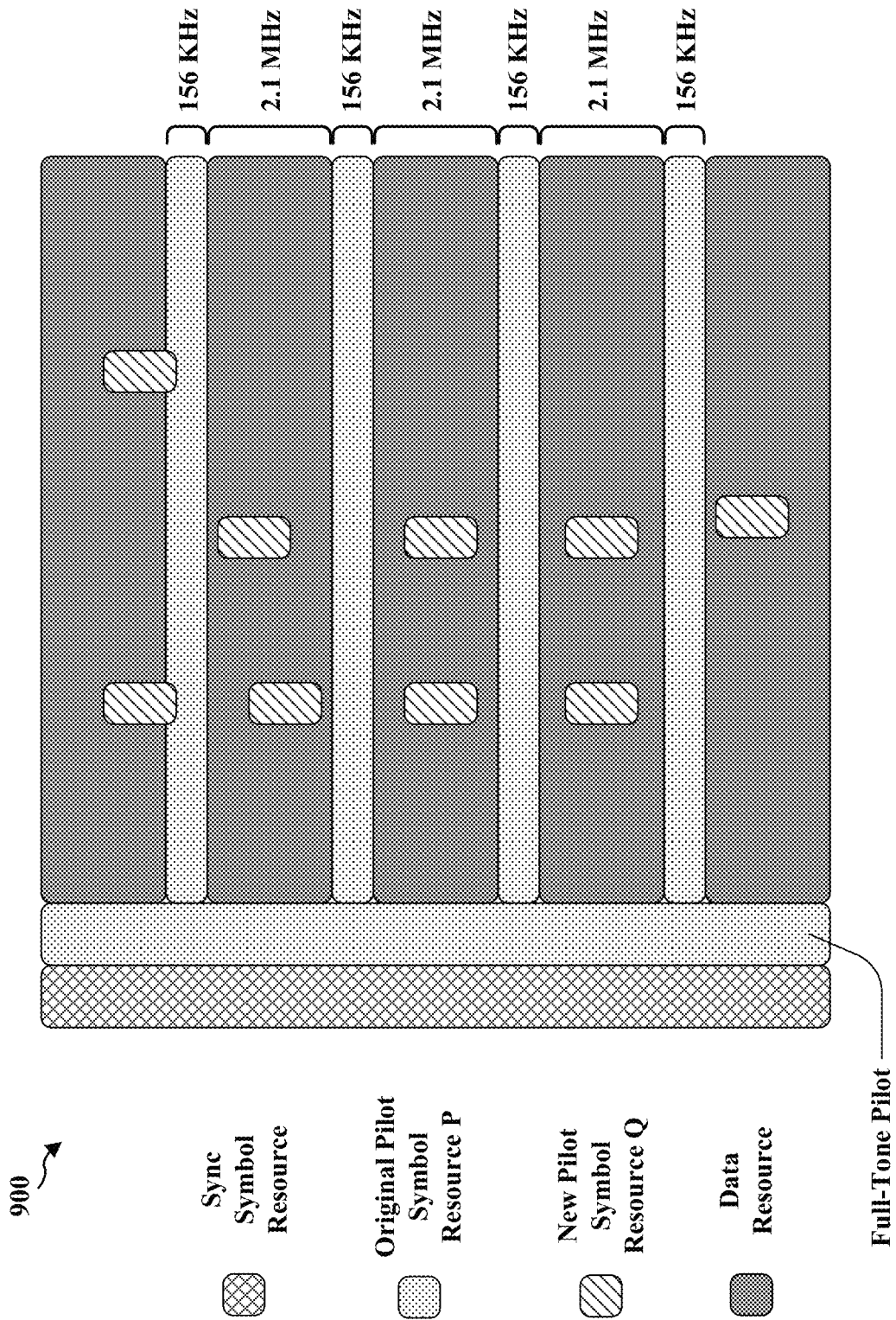
FIG. 9 is a resource structure illustrating an improved pilot symbol scheme.

FIG. 9 is a resource structure 900 illustrating an improved pilot symbol scheme. In FIG. 9, resource positions Q, originally used for transmitting data, are converted for transmitting pilot symbols. Hence, more pilot symbols are added to the data transmission, in positions where older/legacy receivers do not expect to receive the pilot symbols. This may be accomplished by puncturing a K/N rate code to introduce additional Q pilot symbols. The older/legacy receivers will regard the Q pilot symbols as noise. Accordingly, the total number of resources for transmitting data is reduced from T to T−Q. And, the K→N code is scaled to K→M, where M is smaller than N and is such that the code occupies the T−Q resources.

For new receivers, the K→M code appears as a new code with a better pilot structure, and thus better performance. For older/legacy receivers, the K→M code appears as a K→N code with spiky noise in the positions Q since the older/legacy receivers are not aware of the new pilot symbols transmitted in the positions Q. If the number of resources used for the positions Q is small and well distributed, the older/legacy receivers will still be able to receive the transmissions with the improved pilot structure, with only a marginal decrease in performance compared to their decodability of previous transmissions without the improved pilot structure.

Figure 10:
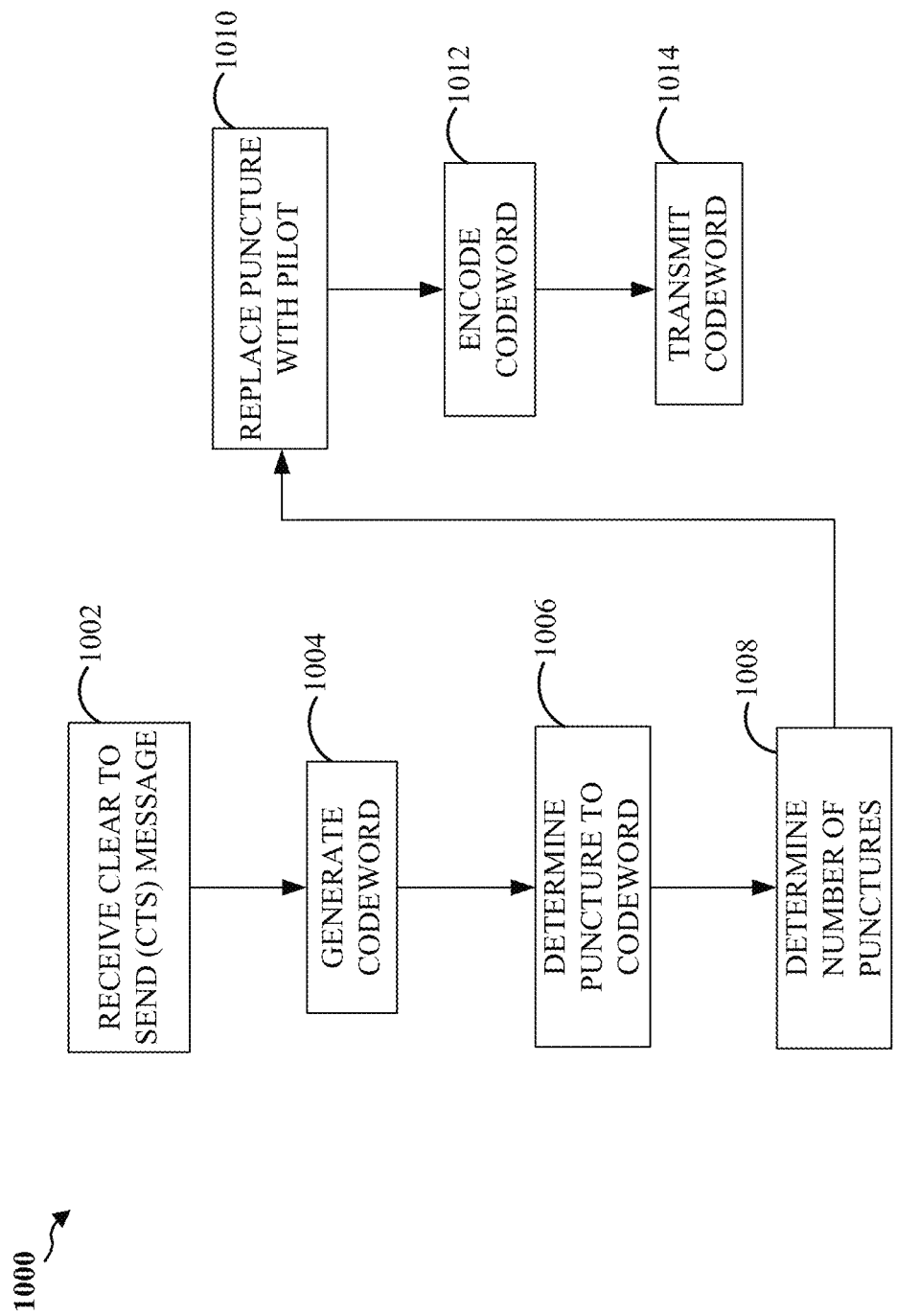
FIG. 10 is a flow chart of a method of wireless communication.

FIG. 10 is a flow chart 1000 of a method of wireless communication. The method may be performed by an eNB. At step 1002, the eNB may receive a clear to send (CTS) message from a UE indicating that the UE is ready to receive a transmission from the eNB. At step 1004, in response to receiving the CTS, the eNB may generate a codeword for transmitting to the UE.

At step 1006, the eNB determines one or more punctures to the codeword. The one or more punctures may be determined based on allowing a legacy receiver/UE to decode the codeword without knowledge of the at least one puncture.

At step 1008, the eNB may determine a number of the one or more punctures to the codeword. Particularly, the eNB may determine a threshold of a number of punctures and select the number of punctures to be less than or equal to the threshold. The threshold of the number of punctures may be determined based on a likelihood of a legacy receiver/UE successfully decoding the codeword having the number of punctures. In the alternative, the eNB may determine the number of punctures based on balancing a channel estimation error of non-legacy UEs and a decoding performance of legacy UEs.

At step 1010, the eNB replaces each determined puncture of the codeword with a pilot. At step 1012, the eNB may then encode the codeword using an encoder, such as a convolutional encoder, for example. And, at step 1014, the eNB may transmit the encoded codeword to the UE. The eNB may transmit the codeword in an IEEE 802.11 frame. The eNB may also transmit the codeword in orthogonal frequency division multiplexing (OFDM) symbols.

Accordingly, for newer receivers/UEs, the transmitted codeword will appear as a new codeword with a better pilot structure, and thus better performance. For older/legacy receivers/UEs, the transmitted codeword will appear as a codeword having spiky noise in the positions punctured and replaced with pilots. This is due to the older/legacy receivers/UEs not being aware of the new pilots transmitted in the punctured positions. Thus, newer generation receivers experience improved channel estimation performance while older generation devices that are unaware of a change in pilot positions may still decode messages from the new transmissions.

Figure 11:
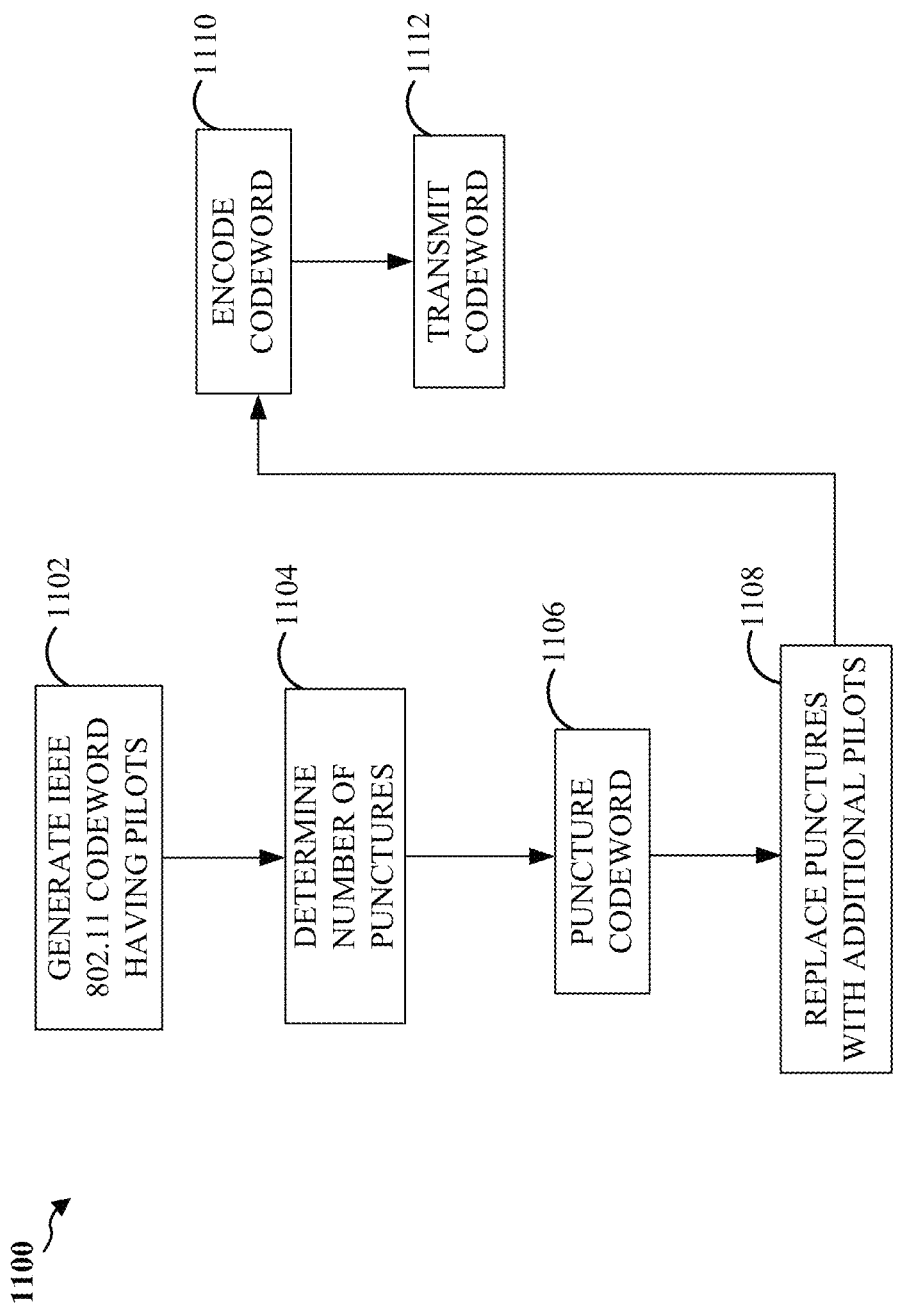
FIG. 11 is a flow chart of a method of wireless communication.

FIG. 11 is a flow chart 1100 of a method of wireless communication. The method may be performed by an eNB.

At step 1102, the eNB generates a codeword for transmitting to a UE. Particularly, the codeword may be a codeword of an IEEE 802.11 communication system having pilots in a first set of subcarriers.

At step 1104, the eNB may determine a number of punctures of the codeword. The number of punctures may be determined based on allowing a legacy receiver/UE to decode the codeword without knowledge of the punctures. Moreover, the eNB may determine a threshold of the number of punctures and select the number of punctures to be less than or equal to the threshold. The threshold of the number of punctures may be determined based on a likelihood of the legacy receiver/UE successfully decoding the codeword having the number of punctures. In the alternative, the eNB may determine the number of punctures based on balancing a channel estimation error of non-legacy UEs and a decoding performance of legacy UEs.

At step 1106, the eNB may puncture the codeword with the determined number of punctures. At step 1108, the eNB may replace the punctures in the codeword with additional pilots unknown to the legacy receiver/UE in a second set of subcarriers. Here, the additional pilots may be in at least two orthogonal frequency division multiplexing (OFDM) symbols comprising a first OFDM symbol and a second OFDM symbol. The first OFDM symbol may include the additional pilots in a first subset of the second set of subcarriers. The second OFDM symbol may include the additional pilots in a second subset of the second set of subcarriers.

At step 1110, the eNB may encode the codeword using an encoder, such as a convolutional encoder, for example. At step 1112, the eNB may transmit the encoded codeword to the UE. The eNB may transmit the codeword with the pilots and the additional pilots. Moreover, the codeword may be transmitted in OFDM symbols, wherein a number of punctures in the codeword for each of the OFDM symbols is less than a threshold. Notably, a number of OFDM symbols in which the codeword is punctured may be based on environmental conditions, such as the dynamics of a vehicle including velocity, multipath conditions, channel conditions, etc.

Accordingly, for newer receivers/UEs, the transmitted IEEE 802.11 codeword will appear as a new codeword with a better pilot structure, and thus better performance. For older/legacy receivers/UEs, the transmitted IEEE 802.11 codeword will appear as an IEEE 802.11 codeword having spiky noise in the positions punctured and replaced with pilots. This is due to the older/legacy receivers/UEs not being aware of the new pilots transmitted in the punctured positions. Thus, newer generation receivers experience improved channel estimation performance while older generation devices that are unaware of a change in pilot positions may still decode messages from the new transmissions.

Figure 12:
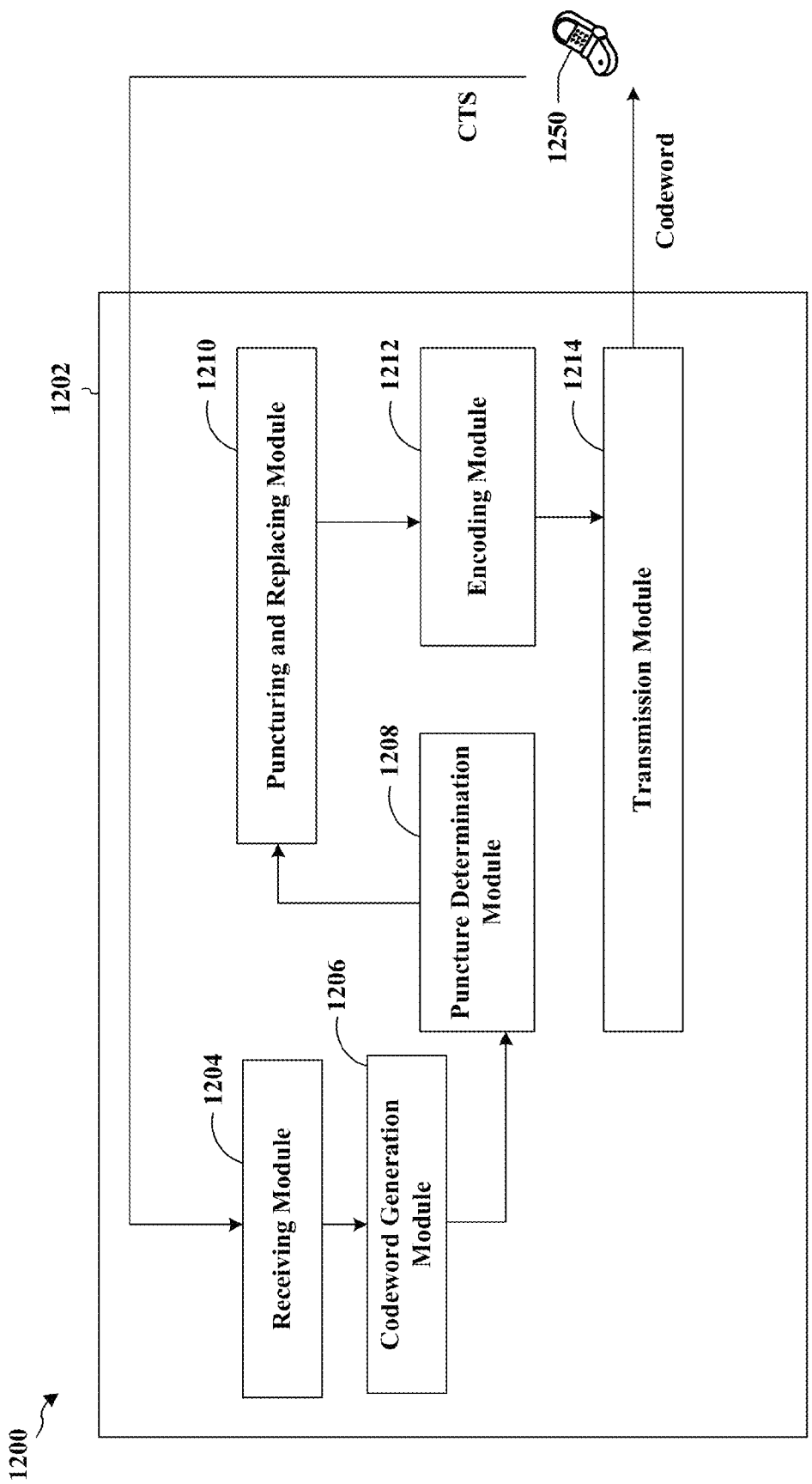
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be an eNB. The apparatus 1202 includes a receiving module 1204, a codeword generation module 1206, a puncture determination module 1208, a puncturing and replacing module 1210, an encoding module 1212, and a transmission module 1214.

In an aspect, the receiving module may receive a clear to send (CTS) message from a UE 1250 indicating that the UE 1250 is ready to receive a transmission from the apparatus 1202. In response to receiving the CTS, the codeword generation module 1206 may generate a codeword for transmitting to the UE 1250.

After generating the codeword, the puncture determination module 1208 may determine one or more punctures to the codeword. The one or more punctures may be determined based on allowing a legacy receiver/UE to decode the codeword without knowledge of the at least one puncture. The puncture determination module 1208 may also determine a number of the one or more punctures to the codeword. Particularly, the puncture determination module 1208 may determine a threshold of a number of punctures and select the number of punctures to be less than or equal to the threshold. The threshold of the number of punctures may be determined based on a likelihood of a legacy receiver/UE successfully decoding the codeword having the number of punctures. In the alternative, the puncture determination module 1208 may determine the number of punctures based on balancing a channel estimation error of non-legacy UEs and a decoding performance of legacy UEs.

The puncturing and replacing module 1210 may replace each determined puncture of the codeword with a pilot. The encoding module 1212 may then encode the codeword using an encoder, such as a convolutional encoder, for example. And, the transmission module 1214 may transmit the encoded codeword to the UE 1250. The codeword may be transmitted in an IEEE 802.11 frame. The codeword may also be transmitted in orthogonal frequency division multiplexing (OFDM) symbols.

In an aspect, the codeword generation module 1206 may generate a codeword for transmitting to the UE 1250. Particularly, the codeword may be a codeword of an IEEE 802.11 communication system having pilots in a first set of subcarriers. The puncture determination module 1208 may determine a number of punctures of the codeword. The number of punctures may be determined based on allowing a legacy receiver/UE to decode the codeword without knowledge of the punctures. Moreover, the eNB may determine a threshold of the number of punctures and select the number of punctures to be less than or equal to the threshold. The threshold of the number of punctures may be determined based on a likelihood of the legacy receiver/UE successfully decoding the codeword having the number of punctures. In the alternative, the puncture determination module 1208 may determine the number of punctures based on balancing a channel estimation error of non-legacy UEs and a decoding performance of legacy UEs.

The puncturing and replacing module 1210 may puncture the codeword with the determined number of punctures and replace the punctures with additional pilots unknown to the legacy receiver/UE in a second set of subcarriers. Here, the additional pilots may be in at least two orthogonal frequency division multiplexing (OFDM) symbols comprising a first OFDM symbol and a second OFDM symbol. The first OFDM symbol may include the additional pilots in a first subset of the second set of subcarriers. The second OFDM symbol may include the additional pilots in a second subset of the second set of subcarriers.

The encoding module 1212 may encode the codeword using an encoder, such as a convolutional encoder, for example. Thereafter, the transmission module 1214 may transmit the encoded codeword to the UE 1250. The transmission module 1214 may transmit the codeword with the pilots and the additional pilots. Moreover, the codeword may be transmitted in OFDM symbols, wherein a number of punctures in the codeword for each of the OFDM symbols is less than a threshold. Notably, a number of OFDM symbols in which the codeword is punctured may be based on environmental conditions, such as the dynamics of a vehicle including velocity, multipath conditions, channel conditions, etc.

The apparatus may include additional modules that perform each of the steps of the algorithm in the aforementioned flow charts FIGS. 10 and 11. As such, each step in the aforementioned flow charts FIGS. 10 and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
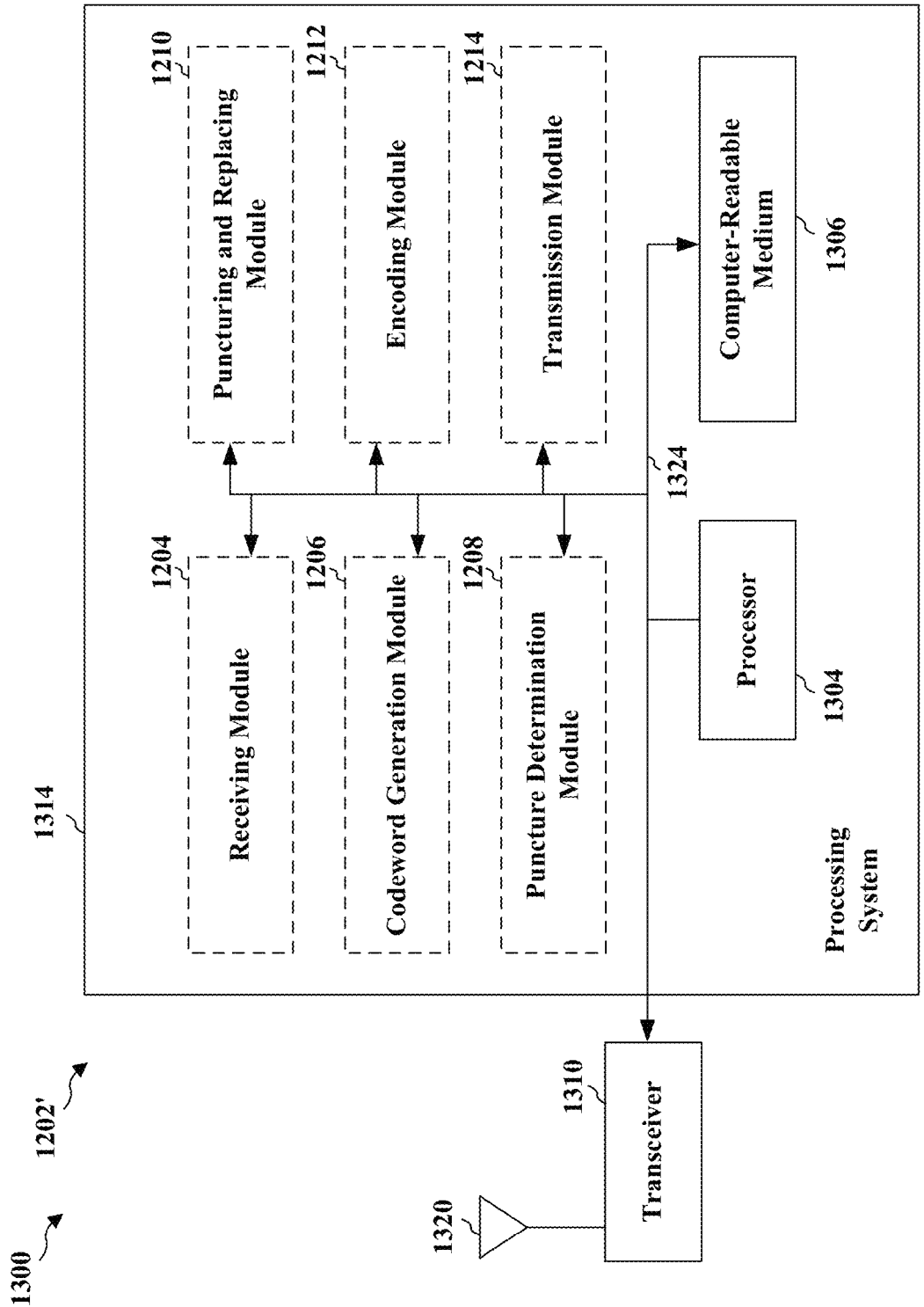
FIG. 13 is a diagram illustrating an example of a hardware implementation for an apparatus employing a processing system.

FIG. 13 is a diagram illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, and 1214. The modules may be software modules running in the processor 1304, resident/stored in the computer readable medium 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 1202/1202' for wireless communication includes means for generating a codeword, means for determining at least one puncture to the codeword based on allowing a legacy receiver to decode the codeword without knowledge of the at least one puncture, means for replacing each of the at least one puncture with a pilot, means for transmitting the codeword, means for determining a threshold of a number of the at least one puncture based on a likelihood of successfully decoding the codeword by the legacy receiver, means for selecting the number of the at least one puncture to be less than or equal to the threshold means for determining a number of the at least one puncture based on balancing a channel estimation error of non-legacy user equipments (UEs) and a decoding performance of legacy UEs, means for receiving a clear to send (CTS) message, wherein the codeword is transmitted in response to the CTS, means for encoding the codeword using a convolutional encoder means for generating an IEEE 802.11 codeword having pilots in a first set of subcarriers, means for puncturing the codeword with additional pilots unknown to a legacy receiver in a second set of subcarriers, means for transmitting the codeword with the pilots and the additional pilots, means for determining a number of punctures of the codeword based on allowing the legacy receiver to decode the codeword without knowledge of the punctures, and means for replacing the punctures with the additional pilots.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   generating a codeword of coded bits from a sequence of bits to be transmitted to a receiver;
   modulating the coded bits onto modulated data symbols occupying a number T of data resources allocated for transmission;
   selecting a number Q of puncture resources from the T data resources;
   replacing the modulated data symbols at the Q puncture resources with puncture pilot symbols carrying puncture pilot information;
   wherein the receiver is either of a first device type configured to use the puncture pilot information at the Q puncture resources, or of the second device type not configured to use the puncture pilot information; and
   wherein the Q puncture resources are selected based on determination that the second device type can decode the codeword without knowledge of presence of the Q puncture resources.

2. The method of claim 1, further comprising:
determining a threshold of a number of the puncture resources based on a likelihood of successfully decoding the codeword by receivers of the second device type; and
selecting the number Q to be less than or equal to the threshold.

3. The method of claim 1, further comprising:
determining a number of the puncture resources based on balancing a channel estimation error of receivers of the first device type and a decoding performance of receivers of the second device type.

4. The method of claim 1, further comprising:
transmitting the codeword in an IEEE 802.11 frame.

5. The method of claim 1, further comprising:
receiving a clear to send (CTS) message, wherein the codeword is transmitted in response to the CTS.

6. The method of claim 1, further comprising:
encoding the codeword using a convolutional encoder.

7. The method of claim 1, further comprising:
transmitting the codeword in orthogonal frequency division multiplexing (OFDM) symbols.

8. The method of claim 4, wherein the Q puncture resources do not overlap with IEEE 802.11 pilot resources that comprise a full-tone pilot at a beginning orthogonal frequency division multiplexing (OFDM) symbol of a packet, and a plurality of comb pilots separated in frequency.

9. The method of claim 8, further comprising:
transmitting the puncture pilot symbols and IEEE 802.11 pilot symbols occupying the IEEE 802.11 pilot resources.

10. The method of claim 8, wherein the puncture resources are in a number of OFDM symbols comprising at least a first OFDM symbol and a second OFDM symbol, with the first OFDM symbol having the puncture resources at a different set of subcarriers than the second OFDM symbol.

11. The method of claim 10, wherein the number of orthogonal frequency division multiplexing (OFDM) symbols having the puncture resources is based on environmental conditions.

12. An apparatus for wireless communication, comprising:
means for generating a codeword of coded bits from a sequence of bits to be transmitted to a receiver;
means for modulating the coded bits onto modulated data symbols occupying a number T of data resources allocated for transmission;
means for selecting a number Q of puncture resources from the T data resources;
means for replacing the modulated data symbols at the Q puncture resources with puncture pilot symbols carrying puncture pilot information;
wherein the receiver is either of a first device type configured to use the puncture pilot information at the Q puncture resources, or of the second device type not configured to use the puncture pilot information; and
wherein the Q puncture resources are selected based on determination that the second device type can decode the codeword without knowledge of presence of the Q puncture resources.

13. The apparatus of claim 12, further comprising:
means for determining a threshold of a number of the puncture resources based on a likelihood of successfully decoding the codeword by receivers of the second device type; and
means for selecting the number Q to be less than or equal to the threshold.

14. The apparatus of claim 12, further comprising:
means for determining a number of the puncture resources based on balancing a channel estimation error of receivers of the first device type and a decoding performance of receivers of the second device type.

15. The apparatus of claim 12, further comprising:
means for transmitting the codeword in an IEEE 802.11 frame.

16. The apparatus of claim 12, further comprising:
means for receiving a clear to send (CTS) message, wherein the codeword is transmitted in response to the CTS.

17. The apparatus of claim 12, further comprising:
means for encoding the codeword using a convolutional encoder.

18. The apparatus of claim 12, further comprising:
means for transmitting the codeword in orthogonal frequency division multiplexing (OFDM) symbols.

19. The apparatus of claim 15, wherein the Q puncture resources do not overlap with IEEE 802.11 pilot resources that comprise a full-tone pilot at a beginning orthogonal frequency division multiplexing (OFDM) symbol of a packet, and a plurality of comb pilots separated in frequency.

20. The apparatus of claim 19, further comprising:
means for transmitting the puncture pilot symbols and IEEE 802.11 pilot symbols occupying the IEEE 802.11 pilot resources.

21. The apparatus of claim 19, wherein the puncture resources are in a number of OFDM symbols comprising at least a first OFDM symbol and a second OFDM symbol, with the first OFDM symbol having the puncture resources at a different set of subcarriers than the second OFDM symbol.

22. The apparatus of claim 21, wherein the number of orthogonal frequency division multiplexing (OFDM) symbols having the puncture resources is based on environmental conditions.

23. An apparatus for wireless communication, comprising:
a processing system configured to:
generate a codeword of coded bits from a sequence of bits to be transmitted to a receiver;
modulate the coded bits onto modulated data symbols occupying a number T of data resources allocated for transmission;
select a number Q of puncture resources from the T data resources;
replace the modulated data symbols at the Q puncture resources with puncture pilot symbols carrying puncture pilot information;
wherein the receiver is either of a first device type configured to use the puncture pilot information at the Q puncture resources, or of the second device type not configured to use the puncture pilot information; and
wherein the Q puncture resources are selected based on determination that the second device type can decode the codeword without knowledge of presence of the Q puncture resources.

24. The apparatus of claim 23, the processing system further configured to:
determine a threshold of a number of the puncture resources based on a likelihood of successfully decoding the codeword by receivers of the second device type; and
select the number Q to be less than or equal to the threshold.

25. The apparatus of claim 23, the processing system further configured to:
determine a number of the puncture resources based on balancing a channel estimation error of receivers of the first device type and a decoding performance of receivers of the second device type.

26. The apparatus of claim 23, the processing system further configured to:
    transmit the codeword in an IEEE 802.11 frame.

27. The apparatus of claim 23, the processing system further configured to:
    receive a clear to send (CTS) message, wherein the codeword is transmitted in response to the CTS.

28. The apparatus of claim 23, the processing system further configured to:
    encode the codeword using a convolutional encoder.

29. The apparatus of claim 23, the processing system further configured to:
    transmit the codeword in orthogonal frequency division multiplexing (OFDM) symbols.

30. The apparatus of claim 26, wherein the Q puncture resources do not overlap with IEEE 802.11 pilot resources that comprise a full-tone pilot at a beginning orthogonal frequency division multiplexing (OFDM) symbol of a packet, and a plurality of comb pilots separated in frequency.

31. The apparatus of claim 30, the processing system further configured to:
    transmit the puncture pilot symbols and IEEE 802.11 pilot symbols occupying the IEEE 802.11 pilot resources.

32. The apparatus of claim 30, wherein the puncture resources are in a number of OFDM symbols comprising at least a first OFDM symbol and a second OFDM symbol, with the first OFDM symbol having the puncture resources at a different set of subcarriers than the second OFDM symbol.

33. The apparatus of claim 32, wherein the number of orthogonal frequency division multiplexing (OFDM) symbols having the puncture resources is based on environmental conditions.

34. A computer program product, comprising:
a non-transitory computer-readable medium comprising code for:
generating a codeword of coded bits from a sequence of bits to be transmitted to a receiver;
modulating the coded bits onto modulated data symbols occupying a number T of data resources allocated for transmission;
selecting a number Q of puncture resources from the T data resources;
replacing the modulated data symbols at the Q puncture resources with puncture pilot symbols carrying puncture pilot information;
wherein the receiver is either of a first device type configured to use the puncture pilot information at the Q puncture resources, or of the second device type not configured to use the puncture pilot information; and
wherein the Q puncture resources are selected based on determination that the second device type can decode the codeword without knowledge of presence of the Q puncture resources.

35. The computer program product of claim 34,
the non-transitory computer-readable medium further comprising code for:
transmitting the codeword in an IEEE 802.11 frame, wherein the Q puncture resources do not overlap with IEEE 802.11 pilot resources that comprise a full-tone pilot at a beginning orthogonal frequency division multiplexing (OFDM) symbol of a packet, and a plurality of comb pilots separated in frequency.

* * * * *